United States Patent [19]
Duncan et al.

[11] Patent Number: 5,620,125
[45] Date of Patent: Apr. 15, 1997

[54] BUMPER ATTACHABLE ACCESSORY SUPPORT DEVICE

[75] Inventors: Michael W. Duncan; Patricia A. Duncan, both of Lake City, Minn.

[73] Assignee: Even Par Enterprises, Inc., Lake City, Minn.

[21] Appl. No.: 517,533

[22] Filed: Aug. 21, 1995

[51] Int. Cl.⁶ .................. B60R 9/00; B60R 11/00
[52] U.S. Cl. ............. 224/515; 224/274; 224/401; 224/516; 224/511; 224/512; 224/514
[58] Field of Search ............. 224/515, 511, 224/512, 514, 516, 522, 523, 524, 553, 558, 274, 401, 403, 404, 405, 489, 488, 430, 482, 275; 280/47.26; 248/689, 645, 670, 220.21, 313, 316.4; 108/28, 31, 152

[56] References Cited

U.S. PATENT DOCUMENTS

| | | | |
|---|---|---|---|
| 1,817,056 | 8/1931 | Belgard | 224/514 |
| 1,906,920 | 5/1933 | Sheffer | 224/528 |
| 1,919,271 | 7/1933 | Cady | 224/560 |
| 2,818,316 | 12/1957 | D'Andrade | 311/21 |
| 3,744,689 | 7/1973 | Kjensmo | 224/42.03 |
| 4,046,297 | 9/1977 | Bland | 224/42.03 |
| 4,279,365 | 7/1981 | Hutmacher | 224/42.42 |
| 4,360,135 | 11/1982 | Goble | 224/42.08 |
| 4,989,767 | 2/1991 | Buschbom | 224/274 |
| 5,052,604 | 10/1991 | Tourangeau | 224/274 |
| 5,409,154 | 4/1995 | Blount | 224/274 |

FOREIGN PATENT DOCUMENTS 1265483  2/1990  Canada ................... 224/32

*Primary Examiner*—Henry J. Recla
*Assistant Examiner*—Kam Shah
*Attorney, Agent, or Firm*—Westman, Champlin & Kelly, P.A.

[57] ABSTRACT

An apparatus supports an accessory on a bumper of a golf car. The apparatus includes an accessory support portion and a bumper engaging portion connected to the accessory support portion. An adjustable clamping portion is connectable to the bumper engaging portion to clamp the bumper between the bumper engaging portion and the adjustable clamping portion. A connector connects the adjustable clamping portion to the bumper engaging portion. Both the adjustable clamping portion and the connector are adjustable to accommodate bumpers having different physical size characteristics.

11 Claims, 6 Drawing Sheets

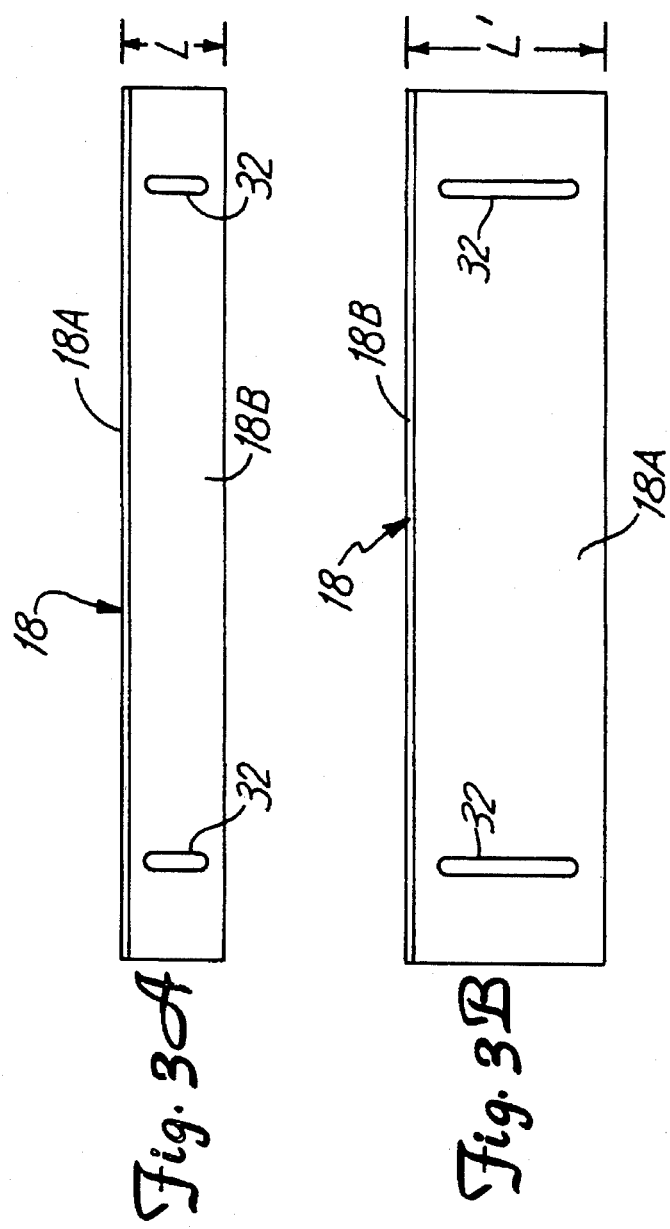

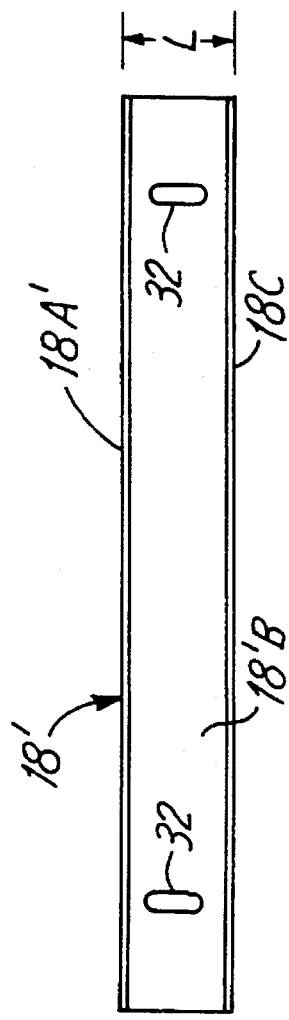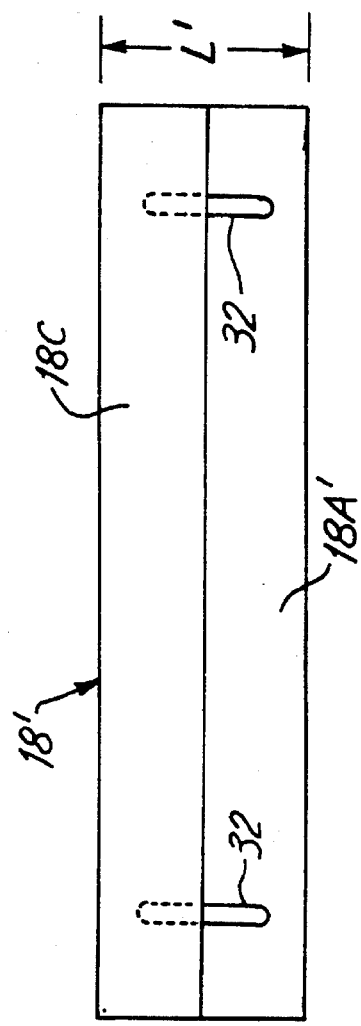

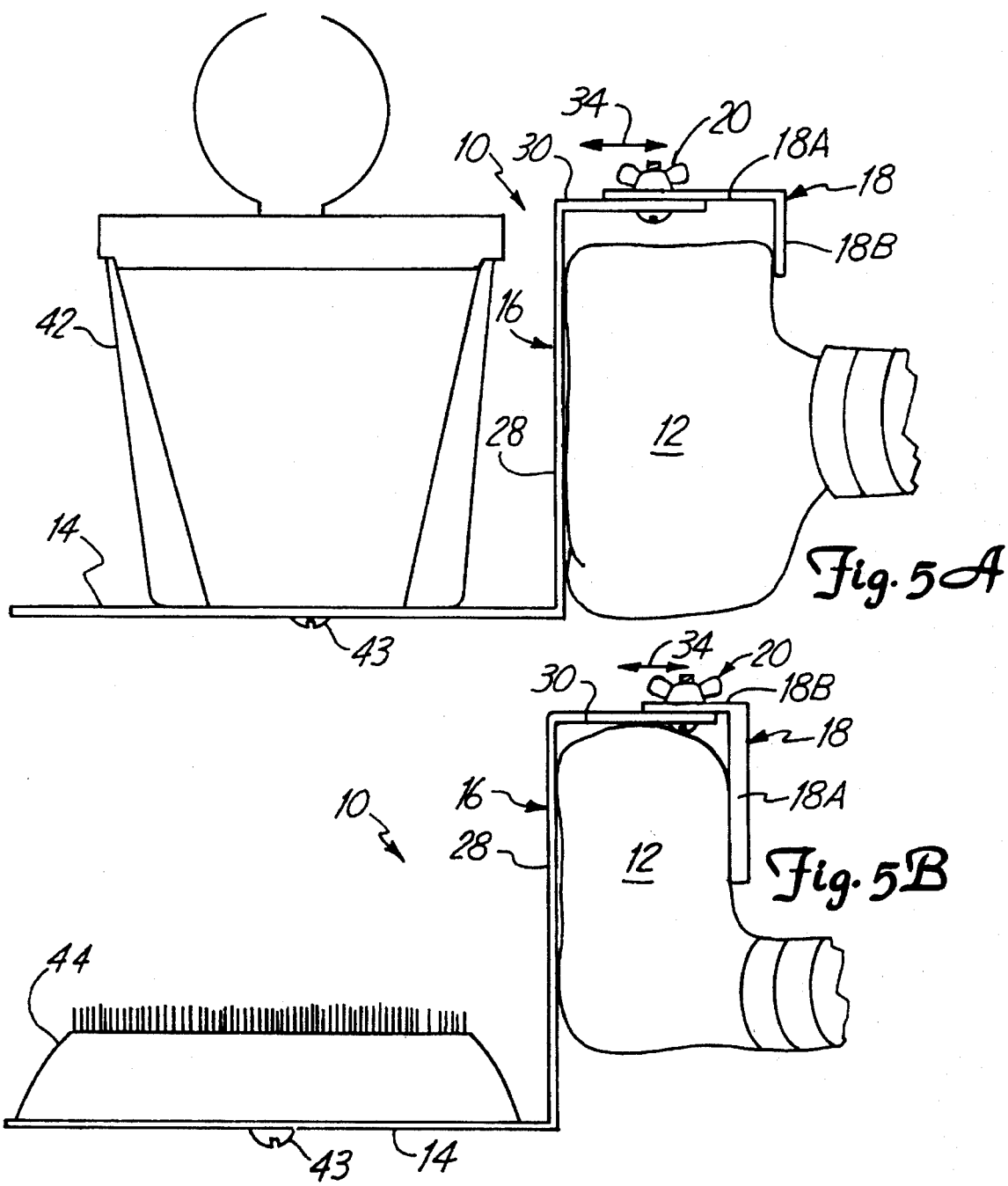

BUMPER ATTACHABLE ACCESSORY SUPPORT DEVICE

BACKGROUND OF THE INVENTION

The present invention deals with an accessory support device. More particularly, the present invention deals with an accessory support device which is attachable to the bumper of a vehicle.

Golf cars are typically small electrically powered, or gas powered, vehicles which are used to transport golfers, and golf equipment, around a golf course. Golf cars are in wide usage today. Many golfers own their own golf cars, and golf cars are available for rent on nearly every public and private course currently in operation.

Current golf cars come in many different shapes and sizes, both with and without bumpers. Those with bumpers have bumpers which are of varying width, shape, and length. These different physical size characteristics range from, for example, a 2½ inch wide bumper to a very thin (approximately ¼ inch or less) sheet of metal which serves as a bumper.

Current golf cars suffer from at least one deficiency. There is very little storage space in the golf car, and very little room for supporting accessories (other than golf clubs) which hold the accessories in a position readily accessible to a golfer who is standing outside the car. For instance, many cars have trays molded into the frames thereof. However, the trays are fairly small in size and meant for holding golf balls, tees, and golf gloves. Such trays are not large enough to support larger accessories such as a spike brush, or a ball washer or club cleaner. Further, typical golf cars have a basket mounted behind the passenger seat. While such baskets are large enough, typically, to hold a cooler or spike brush, the baskets are not readily accessible to a golfer standing outside the golf car. A golfer would find it highly impractical to try to clean golf spikes or a golf club with an accessory supported by the basket mounted to the rear of the passenger seats.

Typical golf cars also have can or bottle carriers molded into the frame and dimensioned to fit the exterior dimensions of a typical soda can, or soda bottle. However, only one such can carrier is typically provided for each passenger. Since golf clubs and country clubs commonly make a great deal of money on beverage sales, this limitation on the ability of a golfer to carry beverages significantly limits the club's ability to make money on beverage sales.

SUMMARY OF THE INVENTION

An apparatus supports an accessory on a bumper of a golf car. The apparatus includes an accessory support portion and a bumper engaging portion connected to the accessory support portion. An adjustable clamping portion is connectable to the bumper engaging portion to clamp the bumper between the bumper engaging portion and the adjustable clamping portion. A connector connects the adjustable clamping portion to the bumper engaging portion. Both the adjustable clamping portion and the connector are adjustable to accommodate bumpers having different physical size characteristics.

BRIEF DESCRIPTION OF THE DRAWINGS

FIGS. 3A–3C illustrate a clamping portion of the support device shown in FIG. 1.

FIGS. 4A–4C show a second embodiment of the clamping portion of the support device shown in FIG. 1.

FIGS. 5A–5C show the support device shown in FIG. 1 installed on different bumper types.

DETAILED DESCRIPTION OF THE PREFERRED EMBODIMENTS

Figure 1:
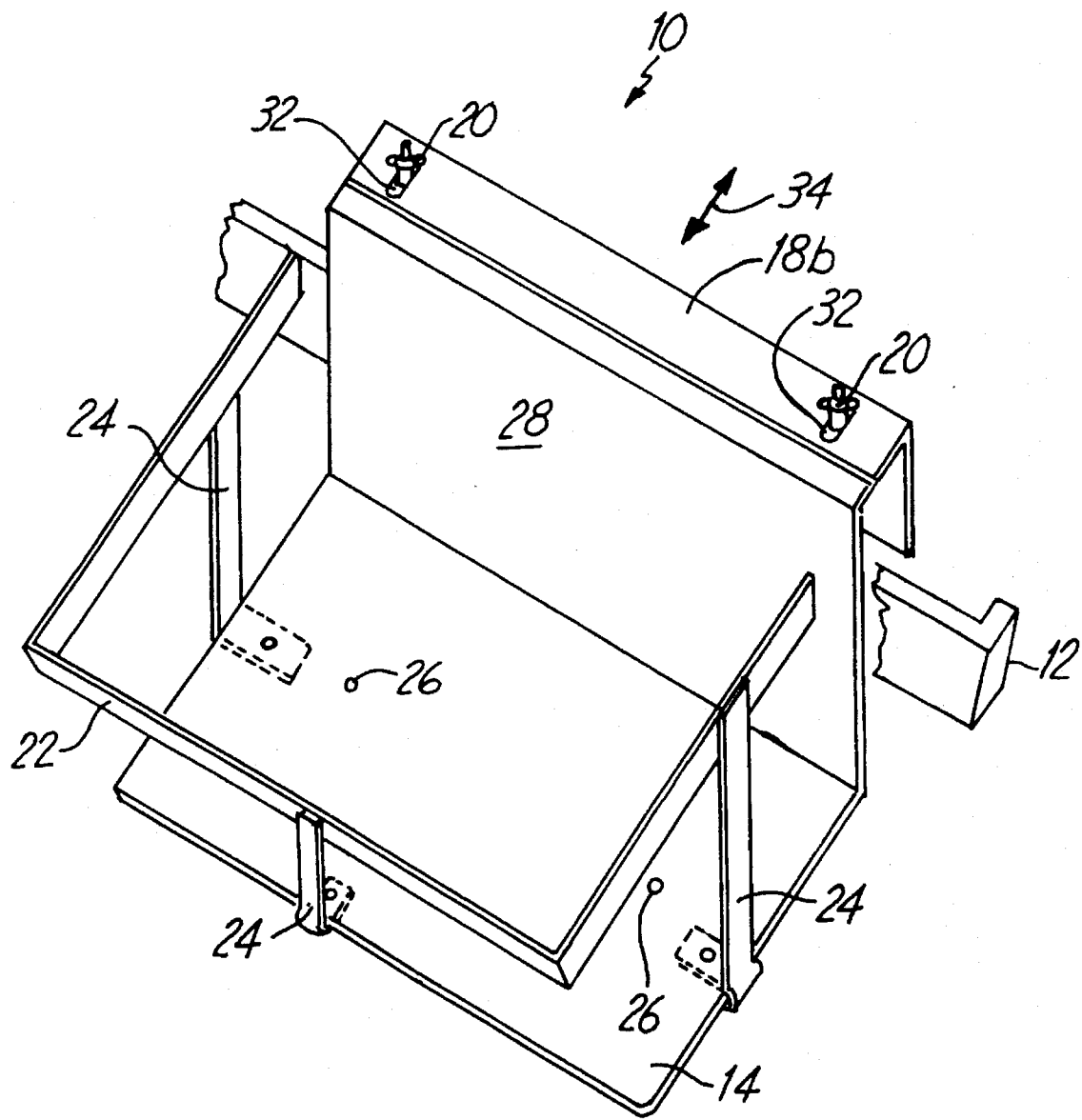
FIG. 1 is a perspective view of a support device according to the present invention.

FIG. 1 is a perspective view of an accessory support device 10 according to the present invention. Support device 10 is shown positioned adjacent a portion of a golf car bumper 12 (or bumper of another vehicle). Support device 10 includes accessory support member 14, bumper engaging portion 16, and adjustable clamping member 18. A pair of connectors 20 are also shown connecting clamping member 18 to bumper engaging portion 16. In addition, the embodiment shown in FIG. 1 shows a rail 22 supported in spaced relation to support portion 14 by a plurality of support legs 24. Legs 24 extend beneath support portion 14 and are releasably secured thereto.

Accessory support portion 14 is a generally flat and planar portion of a stamped larger member which includes bumper engaging portion 16. The support portion 14 preferably has a plurality of accessory supporting apertures 26 formed therein. Apertures 26 are sized to permit passage therethrough of appropriate screws or other fastening devices which can be attached to the accessory supported by support portion 14.

Bumper engaging portion 16 is preferably integrally formed with support portion 14 and extends at an angle relative to support portion 14. Bumper engaging portion 16 includes a stand-off portion 28 and a connection flange 30.

Clamping member 18 preferably includes a downwardly extending flange 18A and a transversely extending flange 18B. In the embodiment shown in FIG. 1, transversely extending flange 18B includes a plurality of elongate slots 32 which are dimensioned to coincide with corresponding apertures in connection flange 30. The slots 32 and apertures in flange 30 are sized to permit insertion therethrough of screws or bolts (which serve as connectors 20) for securing clamping member 18 to bumper engaging portion 16. Connectors 20 can also be configured as wing nuts threadably connected to corresponding bolts. By loosening the wing nuts, clamping member 18 can be moved in the direction indicated by arrow 34 to accommodate larger or smaller bumpers. When appropriately positioned, the wing nuts 20 are again tightened down to fix clamping portion 18 to bumper engaging portion 16. It should also be noted that standoff portion 28 can also be provided with a thumbscrew that can be tightened to bear against the bumper to provide additional securing force.

All of these parts of support device 10 are preferably formed of 12 gauge steel. However, it should be noted that polyurethane, nylon, or other suitable materials could be used in forming support device 10.

Support portion 14 preferably supports one of any number of accessories, such as a cooler, a spike brush, or a ball washer and club cleaner. Those accessories are better illustrated later in this specification. However, it should be noted that rail 22 and legs 24 are removable and are preferably simply screwed or bolted to support portion 14. Therefore, when a cooler, for instance, is supported by support portion 14, rail 22 is used to hold the cooler in position. However, when another accessory, such as a spike brush, or ball washer and club cleaner is used, those accessories are preferably screwed down onto support portion 14 (or bolted thereto) through apertures 26. In those instances, rail 22 is removed to allow the golfer better access to the accessory.

Figure 2A:
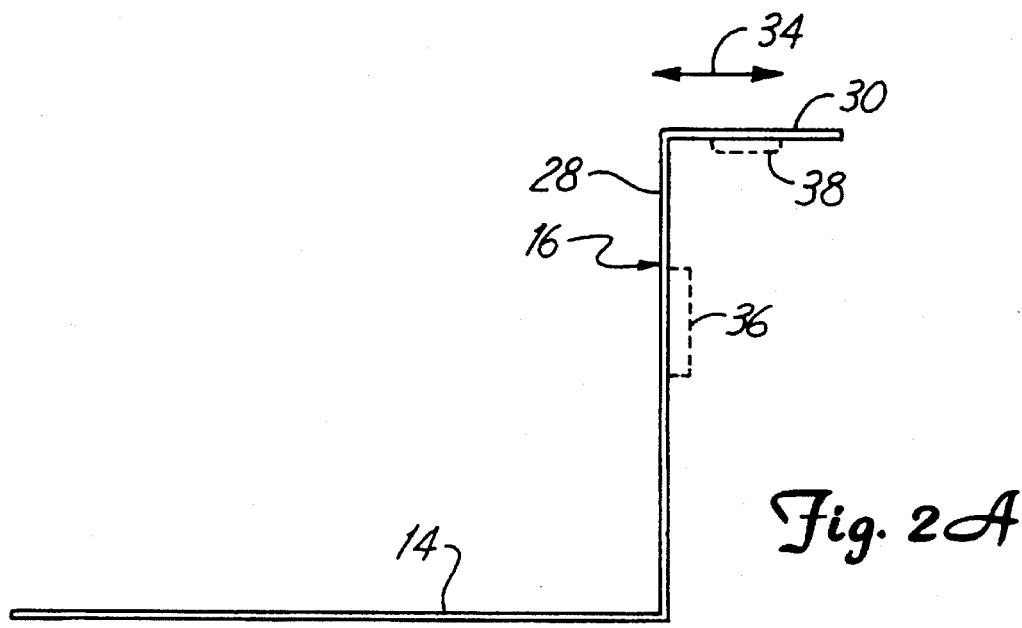
FIGS. 2A and 2B illustrate a portion of the support device shown in FIG. 1.

FIG. 2A is a side view of support portion 14 integrally formed with bumper engaging portion 16. Similar items are similarly numbered to those shown in FIG. 1. For the sake of clarity, rail 22 is removed in FIG. 2A. FIG. 2A illustrates that, in the preferred embodiment, portions 14 and 16 are formed of a single piece of material (such as 12 gauge steel) which is stamped to form portions 14 and 16. FIG. 2A also illustrates another optional feature according to the present invention. A pair of rubberized, adhesive-backed pliable strips 36 and 38 (shown in phantom in FIG. 2A) are applied to bumper engaging portion 16. Such strips are provided to implement a cushion between bumper engaging portion 16 and the bumper 12 of the golf car. This reduces any abrasions or scratches which may occur due to contact between bumper engaging portion 16 and bumper 12. For instance, when a golfer wishes to clean her or his spikes on a spike brush installed on support portion 14, the golfer typically rubs the bottom of the spikes across the spike brush. This can cause moments to act on bumper engaging portion 16 which cause friction between, or relative movement between, bumper engaging portion 16 and bumper 12. With adhesive strips 36 and 38 in place, such movement does not cause any damage to the bumper 12.

Figure 2B:
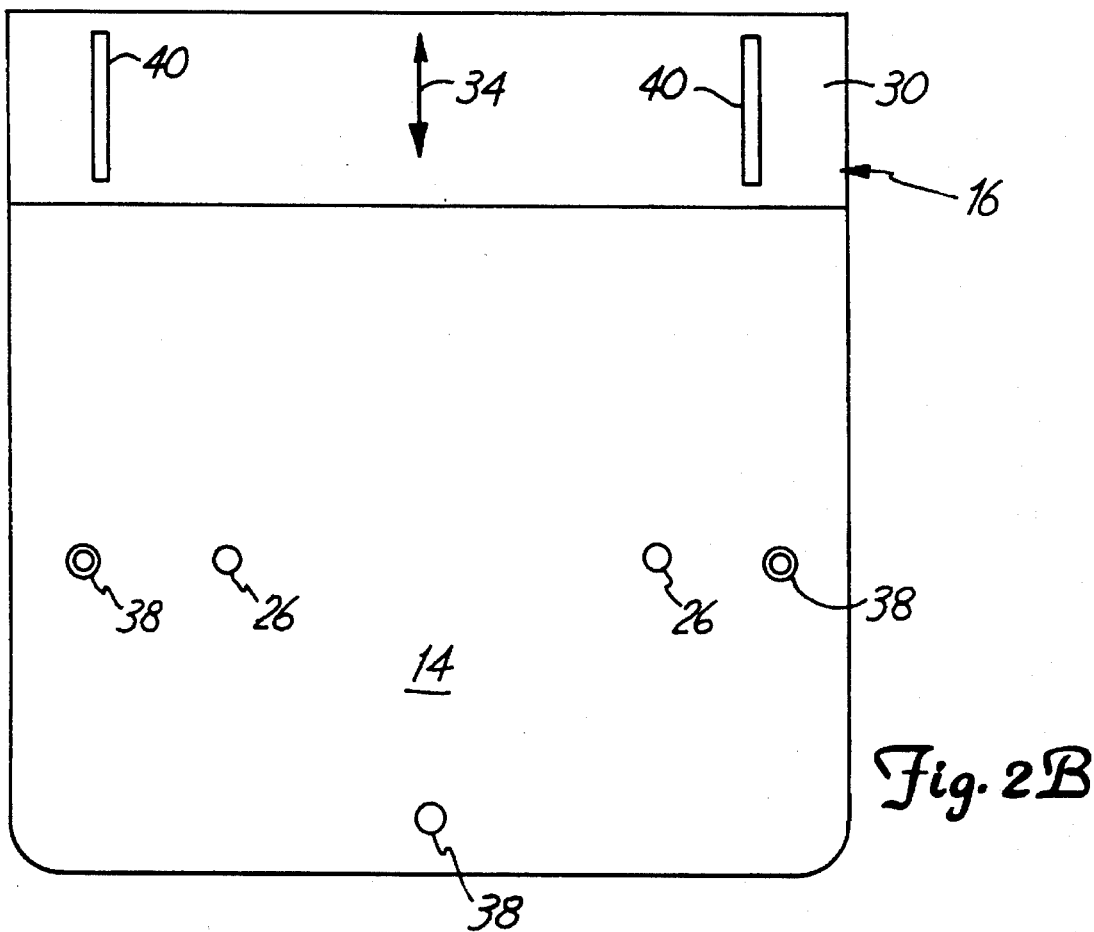

FIG. 2B is a top view of support portion 14 and bumper engaging portion 16 shown in FIG. 2A. FIG. 2B better illustrates that a plurality of apertures 40 are provided in support portion 14, along with apertures 26. Apertures 40 are provided for the installation of legs 24 to support rail 22 in spaced relation to support portion 14. As already discussed, apertures 26 are provided to secure an accessory to support portion 14.

FIG. 2B also better illustrates that a plurality of slots (or elongated apertures) 40 can also be provided in connection flange 30 of bumper engaging portion 16. This further accommodates relative movement between clamping portion 18 and connection flange 30 of bumper engaging portion 16 in the direction indicated by arrow 34 to accommodate different sized bumpers.

FIGS. 3A-3C illustrate a first embodiment of clamping member 18. FIGS. 3A-3C illustrate that clamping member 18 is preferably formed as an integral, unitary member with two flanges or fins, 18A and 18B, disposed at an angle relative to one another.

Flanges 18A and 18B each have a length L and L', respectively. In the preferred embodiment, lengths L and L' are not the same lengths. FIGS. 3A-3C also show that both flanges 18A and 18B are provided with elongated apertures or slots 32 which are separated by a uniform distance. Slots 32 correspond to slots 40 in connection flange 30 of bumper engaging portion 16. Therefore, clamping member 18 can be arranged in one of a plurality of orientations relative to bumper engaging portion 16 to accommodate different bumper widths.

For example, where flange 18B is aligned so that slots 32 in flange 18B overlie slots 40 in connection flange 30, this accommodates a bumper of a certain range of widths. By contrast, when flange 18B is positioned in such an orientation, this provides accommodation of a second range of bumper widths, different from the first range. Further, flange 18B can be oriented such that slots 32 correspond to slots 40, but with flange 18A either extending away from standoff portion 28 of bumper engaging portion 16, or extending inwardly towards standoff portion 28. In the former orientation, bumpers having greater widths are accommodated while in the latter orientation, bumper portions having very small widths are accommodated.

FIGS. 4A-4C show a second embodiment of a clamping member 18'. Clamping member 18', as with clamping member 18, has two flanges 18A' and 18B'. Clamping member 18' is similar to clamping member 18 except that it also has a third flange or fin 18C. This feature, when oriented appropriately with respect to bumper engaging portion 16, provides a hook-type arrangement which can be used to hook on to bumpers or other portions of a golf car. Other features of clamping portion 18' are similar to those shown in FIGS. 3A-3C and are similarly numbered.

Figure 5C:
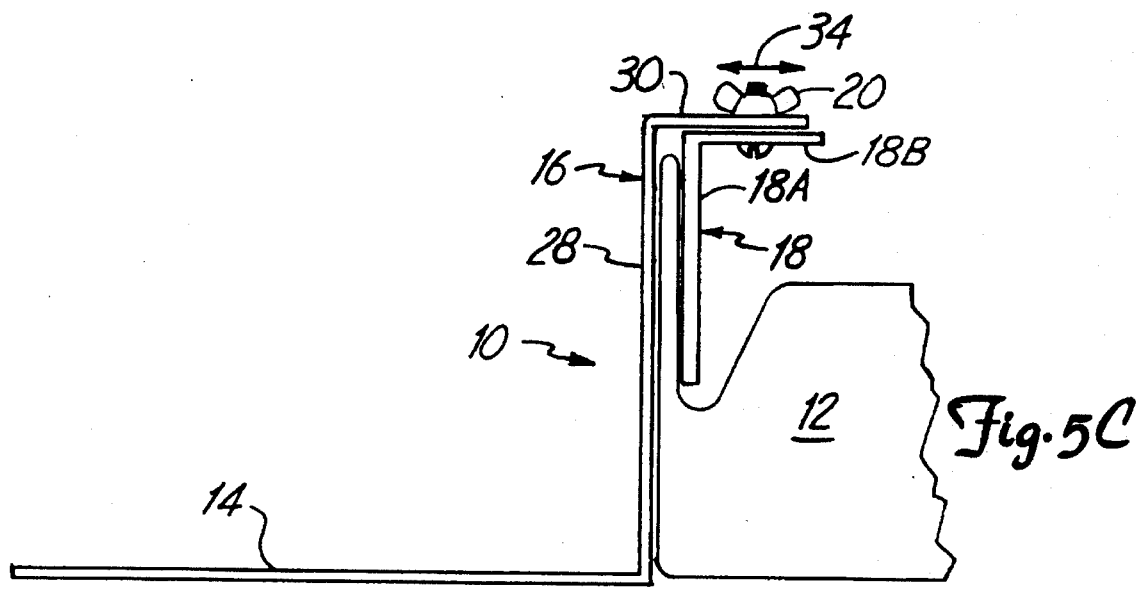

FIGS. 5A-5C show accessory support device 10 supporting a plurality of different accessories, and configured in a plurality of different orientations to accommodate a plurality of different bumpers having different physical size characteristics. FIG. 5A shows that clamping member 18 is coupled to connection flange 30 of bumper engaging portion 16 with apertures or slots 32 of flange 18A overlying slots 40 of bumper engaging portion 16. This allows device 10 to be clamped to a relatively wide bumper. FIG. 5A also shows a ball washer and club cleaner accessory 42 attached to support portion 14 through the use of screws 43 which pass through apertures 26 in support portion 14.

FIG. 5B illustrates an orientation of accessory support device 10 in which clamping portion 18 is oriented relative to bumper engaging portion 16 to accommodate a narrower bumper. In the orientation shown in FIG. 5B, flange 18B is positioned such that slots 32 overlie slots 40 in connection flange 30 of bumper engaging portion 16. Flange 18B holds flange 18A in an outwardly extending position relative to standoff portion 28 of bumper engaging portion 16. FIG. 5B also shows that a spike brush accessory 44 is attached to support portion 14 with screws 43.

FIG. 5C shows another preferred orientation in which flange 18A is positioned such that slots 32 underlie slots 40 in connection flange 30 of bumper engaging portion 16. Flange 18A is orientated such that it supports flange 18B inwardly toward standoff portion 28 of bumper engaging portion 16. This orientation accommodates bumpers having very thin physical size characteristic.

Figure 6:
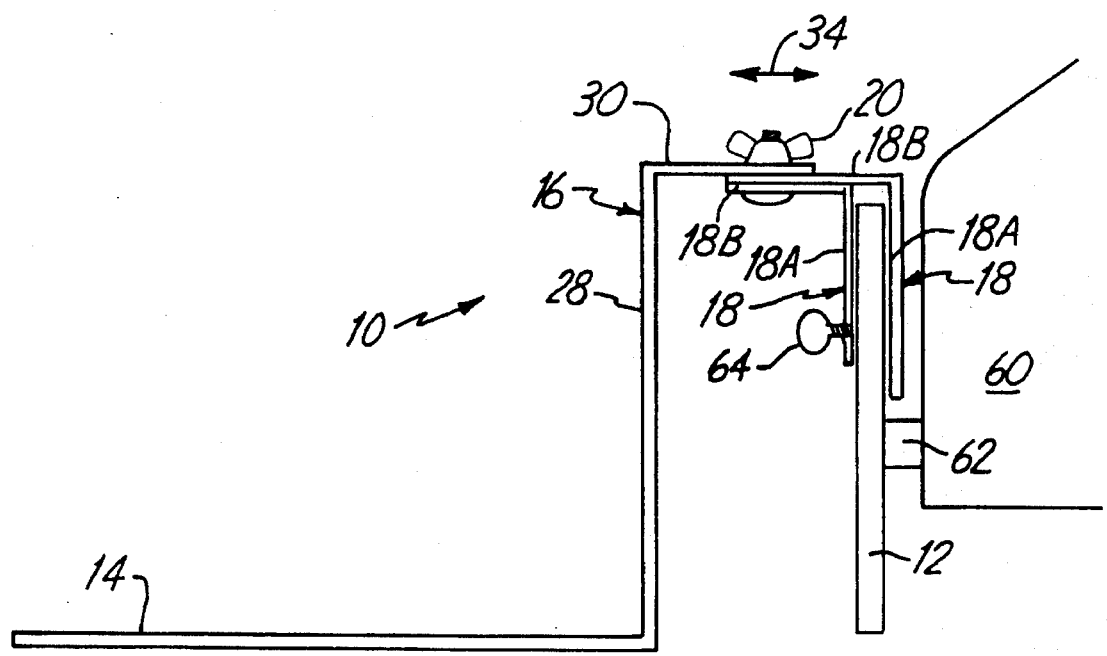
FIG. 6 shows the support device shown in FIG. 1 mounted on another type of bumper with a plurality of clamping members.

FIG. 6 is yet another embodiment showing accessory support device 10 attached to another type of bumper. Harley Davidson golf cars are manufactured with a narrow bumper 12 separated from a main frame portion 60 of the golf car by a very short support 62. Bumper 12 is commonly spaced from frame 60 by a distance of between 1 and 2 inches. In the embodiment shown in FIG. 6, one of the clamping members 18 is larger, and an extended version of the other. The two clamping members 18 are mounted so that they can be adjusted relative to one another to fit about bumper 12. A thumb screw 64 is provided in one of the two clamping members 18 to provide additional securing force against bumper 12. This arrangement provides significant advantages in accommodating tight and narrow bumper areas.

It should be noted that an extended-type flange can also be used in accordance with the present invention. In such an embodiment, either of flanges 18A or 18B or both can be considerably lengthened to better accommodate bumpers of different sizes.

While the present invention has been described as being attached only to golf car bumpers, it will be understood that it could be attached to other appropriate portions of golf cars or other vehicles. For example, on cars commercially designated as E-Z Go cars, no rear bumper is provided. On such cars, the accessory support device 10 according to the present invention is suitable for coupling onto the golf club boot which resembles bumper 12 in FIG. 5C and which is provided on the rear of the golf car to support the golf bags.

Similarly, while the present invention has been disclosed as supporting golf accessories such as ball washers, spike brushes and coolers, it should also be noted that the configuration of the present invention shown in FIG. 1 can be used to support a third and a fourth golf bag on the rear of the golf car. This is particularly useful when a threesome or foursome is playing.

Although the present invention has been described with reference to preferred embodiments, workers skilled in the art will recognize that changes may be made in form and detail without departing from the spirit and scope of the invention.

What is claimed is:

1. An apparatus for supporting an accessory on a bumper of a golf car, the apparatus comprising:
   an accessory support portion;
   a bumper engaging portion connected to the accessory support portion;
   an adjustable clamping portion, connectable to the bumper engaging portion to clamp the bumper between the bumper engaging portion and the adjustable clamping portion while the accessory support portion is in the supporting orientation, the adjustable clamping portion including an abutment member being couplable to the bumper engaging portion in one of a plurality of clamping orientations, the abutment member including a unitary member having two extending flanges, the flanges being alternately connectable to the bumper engaging portion to define two of the plurality of clamping orientations; and
   a connector connecting the adjustable clamping portion to the bumper engaging portion;
   wherein the adjustable clamping portion and the connector are both adjustable to accommodate bumpers having different physical size characteristics.

2. The apparatus of claim 1 wherein the bumper engaging portion has a plurality of apertures therein and wherein each of the two extending flanges has a plurality of apertures therein positioned to align with the apertures in the bumper engaging portion when the corresponding flange is positioned to be connected to the bumper engaging portions.

3. The apparatus of claim 2 wherein the apertures in one of the bumper engaging portion or the flanges are elongated slots.

4. The apparatus of claim 3 wherein the connector comprises:
   a securable member, selectively slidable within the elongated slots and insertable into the aligned apertures and securable to fixedly secure the unitary member to the bumper engaging portion to clamp the bumper between the bumper engaging portion and the unitary member.

5. The apparatus of claim 2 wherein at least one of the flanges is connectable to the bumper engaging portion in a plurality of orientations.

6. The apparatus of claim 1 wherein the accessory support portion includes a plurality of apertures therein for accommodating connection of the accessory thereto.

7. The apparatus of claim 1 and further comprising:
   a rail member, supported in spaced relation to the accessory support portion and extending about a portion of a periphery of the accessory support portion.

8. The apparatus of claim 1 wherein the bumper engaging portion further comprises:
   a padding strip located to engage the bumper when the bumper engaging portion is in engagement with the bumper.

9. The apparatus of claim 8 wherein the padding strip comprises:
   a strip of adhesive backed pliable material.

10. The apparatus of claim 1 and further comprising:
    a second adjustable clamping portion, connectable to the bumper engaging portion to clamp the bumper between the adjustable clamping portion and the second adjustable clamping portion while the accessory support portion is in the supporting orientation.

11. An apparatus for supporting an accessory on a club bumper of a golf car, the apparatus comprising:
    a support member having a plurality of fastening apertures therein;
    a bumper engaging portion connected to the accessory support portion and configured to engage the bumper when the accessory support portion is in a supporting orientation;
    an adjustable clamping portion, connectable to the bumper engaging portion to clamp the bumper between the bumper engaging portion and the adjustable clamping portion while the accessory support portion is in the supporting orientation, the adjustable clamping portion including an abutment member being couplable to the bumper engaging portion in one of a plurality of clamping orientations, the abutment member comprising a unitary member having two extending flanges, the flanges being alternately connectable to the bumper engaging portion to define two of the plurality of clamping orientations; and
    a connector connecting the adjustable clamping portion to the bumper engaging portion;
    wherein the adjustable clamping portion and the connector are both adjustable to accommodate bumper having different physical size characteristics.

* * * * *